Aug. 20, 1946.  F. R. HIGHT ET AL  2,406,219
ROLLING MILL
Filed Dec. 21, 1942    12 Sheets-Sheet 7

INVENTORS
Franklin R. Hight
Robert O. Greenshields
Friedrich J. Mueller and
BY
ATTORNEY

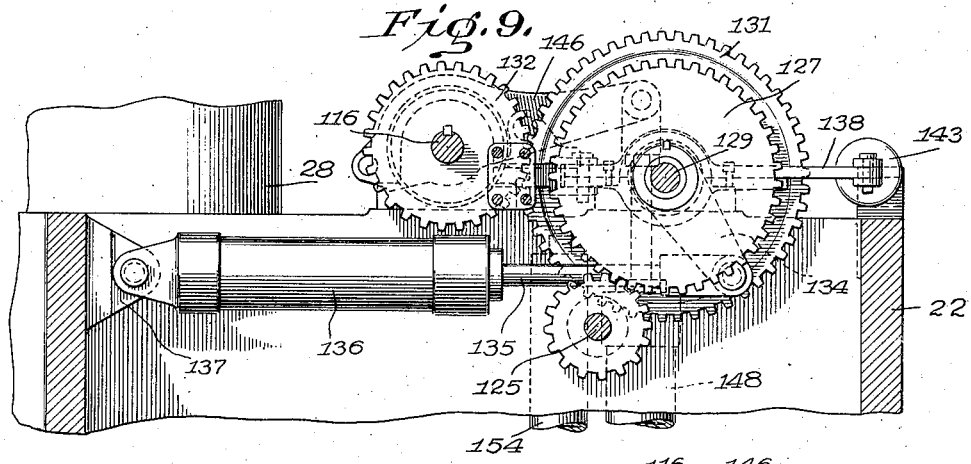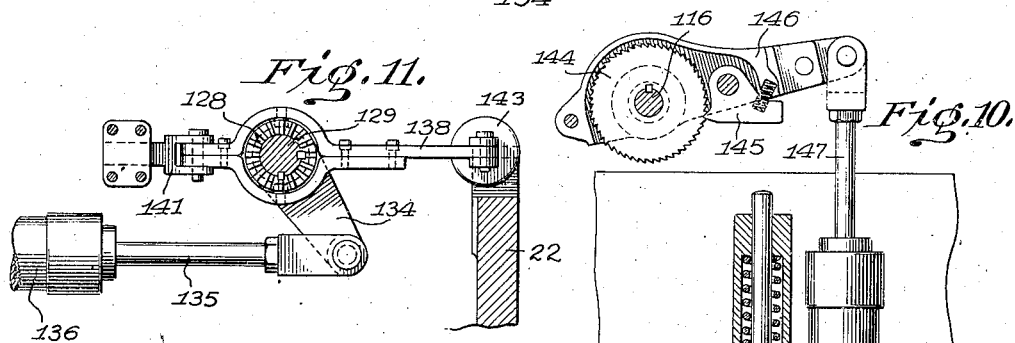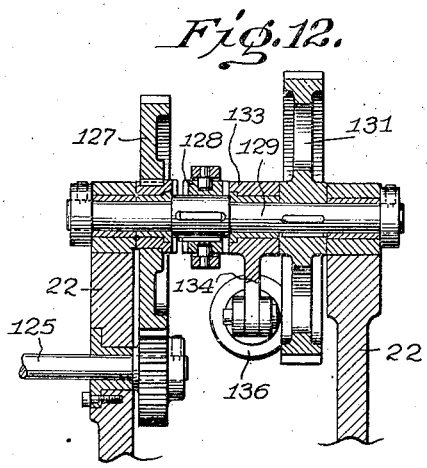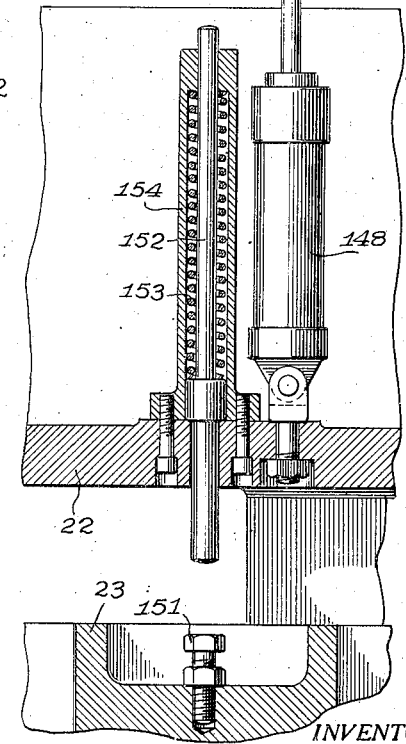

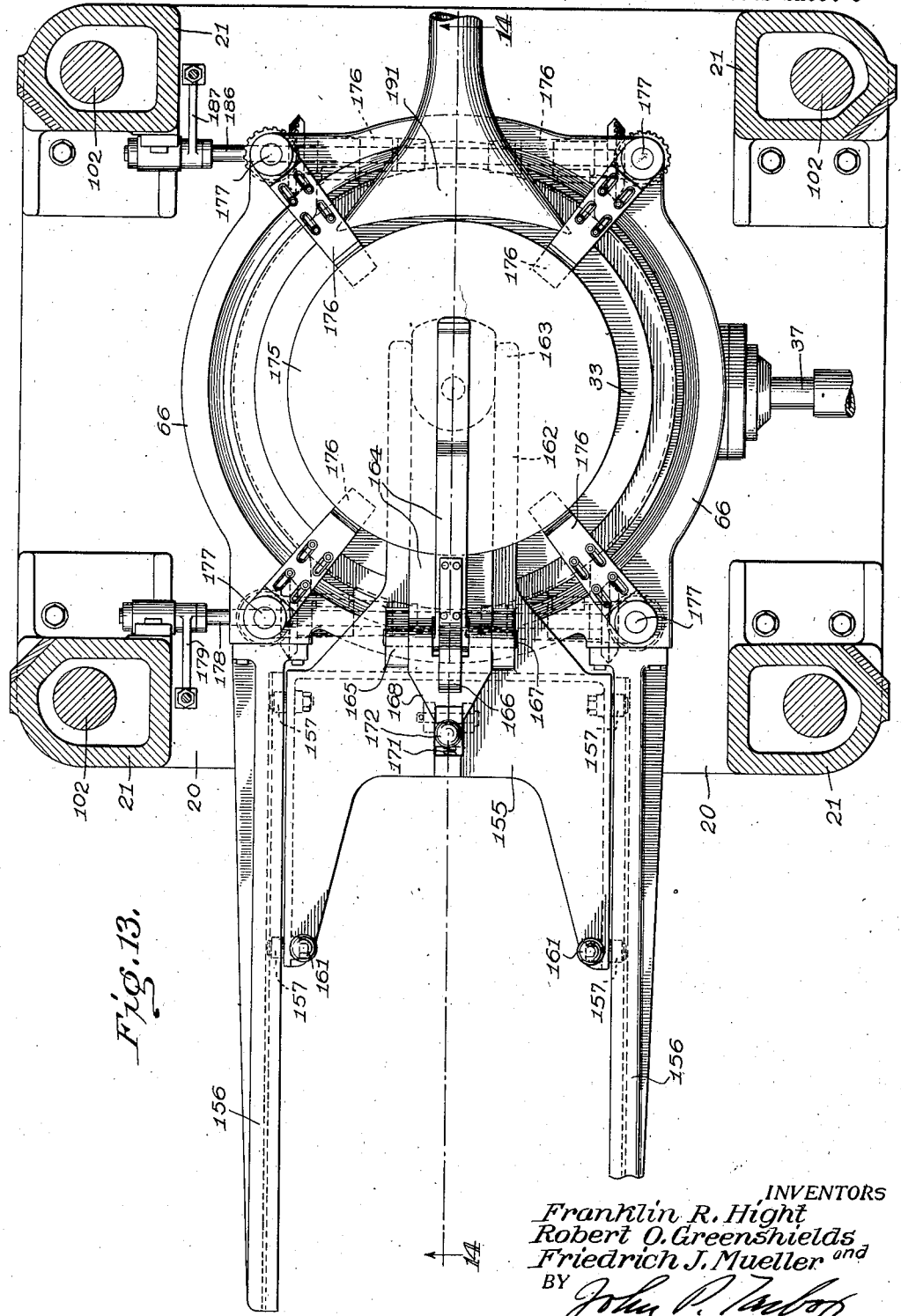

Aug. 20, 1946.  F. R. HIGHT ET AL  2,406,219
ROLLING MILL
Filed Dec. 21, 1942  12 Sheets-Sheet 10
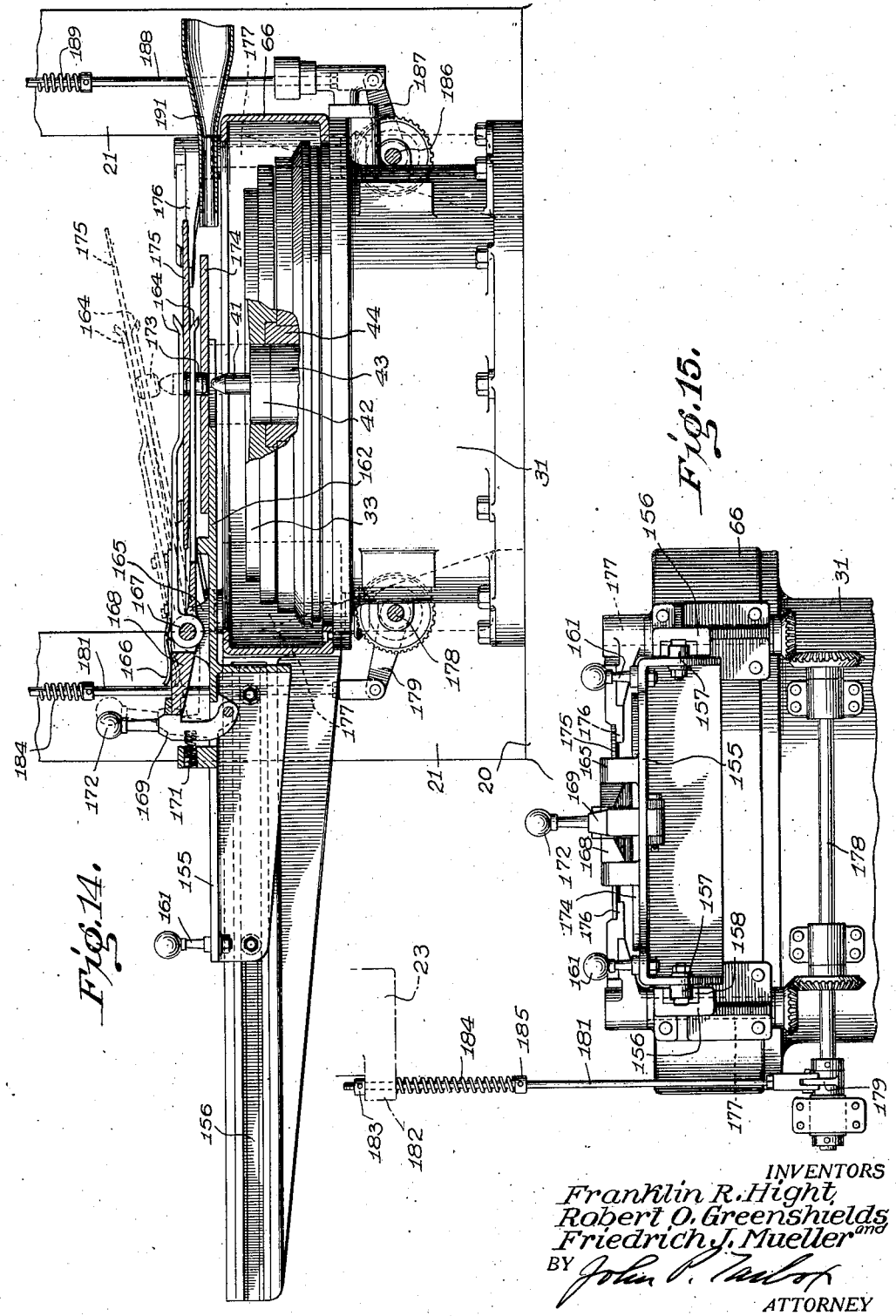
INVENTORS
Franklin R. Hight,
Robert O. Greenshields,
Friedrich J. Mueller and
BY
ATTORNEY Aug. 20, 1946.　　　F. R. HIGHT ET AL　　　2,406,219
ROLLING MILL
Filed Dec. 21, 1942　　　12 Sheets-Sheet 11

INVENTORS
Franklin R. Hight
Robert O. Greenshields
Friedrich J. Mueller
BY
ATTORNEY

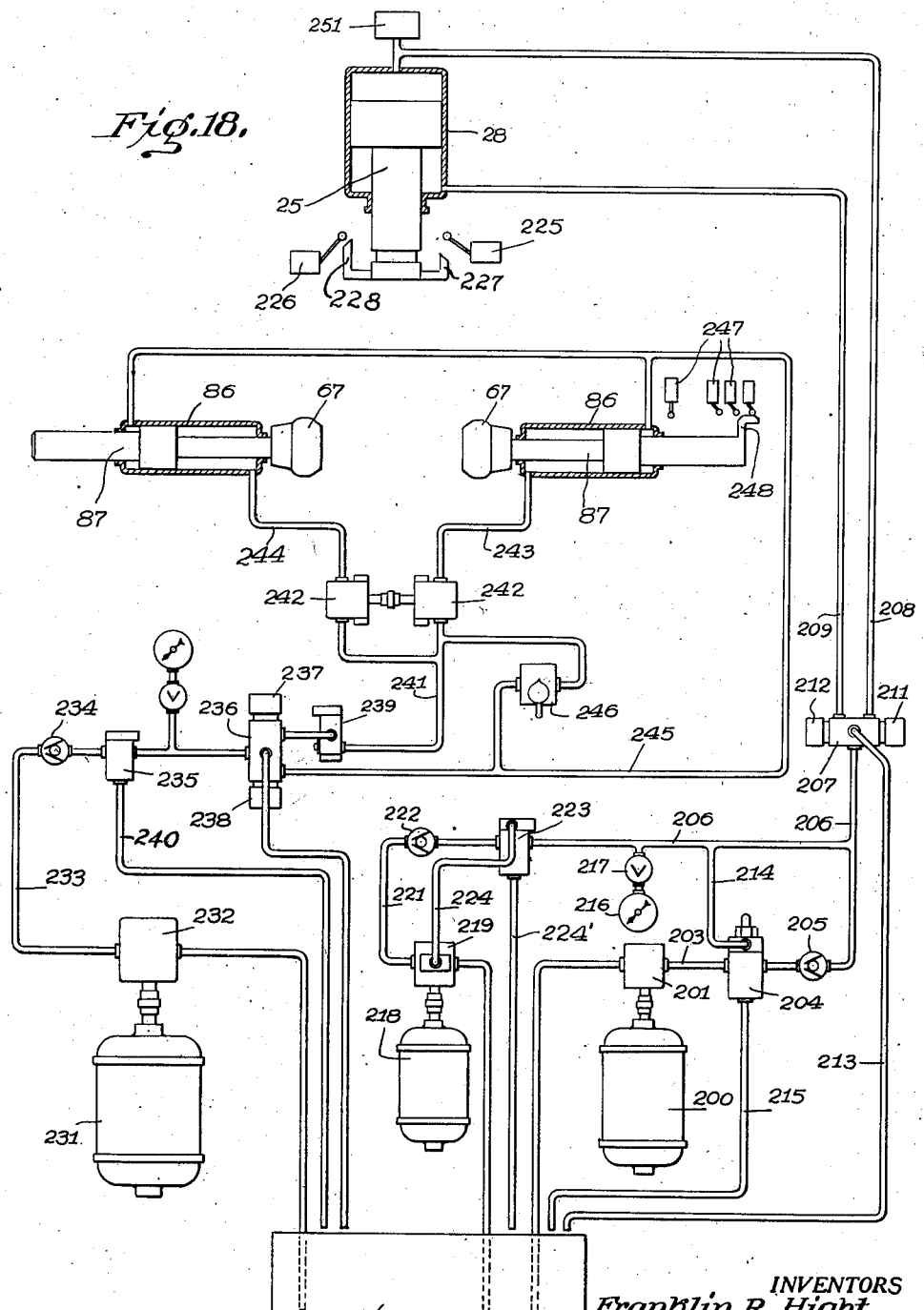

Patented Aug. 20, 1946

2,406,219

UNITED STATES PATENT OFFICE 2,406,219

ROLLING MILL

Franklin R. Hight and Robert O. Greenshields, Detroit, and Friedrich J. Mueller, Grosse Pointe Woods, Mich., assignors, by mesne assignments, to The Budd Company, Philadelphia, Pa., a corporation of Pennsylvania Application December 21, 1942, Serial No. 469,660

19 Claims. (Cl. 80—16)

This invention relates to rolling mills and particularly to mills for rolling relatively thin discs from flat blanks.

One well-known type of mill for this purpose employs a rotary table for supporting and rotating a blank while a pair of horizontally supported rolls are moved into rolling engagement with the blank on opposite sides of the center thereof and move outwardly radially of the blank as it rotates so as to have a combined rolling and spinning effect to produce a relatively thin disc having a considerably larger diameter than the original blank. Usually, these mills are so constructed that when rolling a given thickness of disc, the rolls are adjusted and fixed relatively to the surface of the blank supporting table to provide a working pass the size of the finished disc. As a result, if it is desired to subject a given blank to a plurality of rolling passes it is necessary to "backtrack" the rolls to the center of the disc along the same path which they followed in their outward rolling movement and while in contact with the surface of the blank, after which the rolling operation can be repeated with the same size working pass as previously. While such an operation is possible and can be repeated to provide the desired number of rolling passes, it is a very severe treatment for the metal of the disc in that the rolls are forced inwardly to their starting position while in contact with the disc's surface.

An object of this invention is to provide a mill for rolling relatively thin discs from flat blanks constructed and arranged to provide any desired number of successive rolling passes for a given disc without backtracking the rolls in contact with the disc's surface.

A further object is to provide a mill for rolling discs in which a blank is subjected to successive passes of diminishing size.

A further object is to provide a mill for rolling discs having an improved position of the roll in regard to the disc's surface resulting in an improved rolling operation and a better surface on the finished product.

A further object is to provide a disc rolling mill arranged for operation by a single operator.

A still further object is to provide a mill for rolling discs having an improved blank and disc handling mechanism for removing rolled discs from the blank support and depositing fresh blanks thereon.

A still further object is to provide a mill constructed and arranged to roll a disc in such a way that the rolling operation is substantially equally divided between the different rolls of the mill.

A further object is to provide a mill constructed and arranged to control the speed of rotation of a blank being rolled so as to maintain the speed at the point of rolling substantially constant.

A further object is to provide a mill in which successive rolling passes of the rolls are automatically increased in length in accordance with the increase in the diameter of the blank being rolled.

A further object is to provide a disc rolling mill of such improved construction and mode of operation as produces an improved product.

These and other objects, which will be apparent to those skilled in the art, are accomplished by the invention hereinafter described, one embodiment of which is shown in the accompanying drawings in which.

Figure 1:
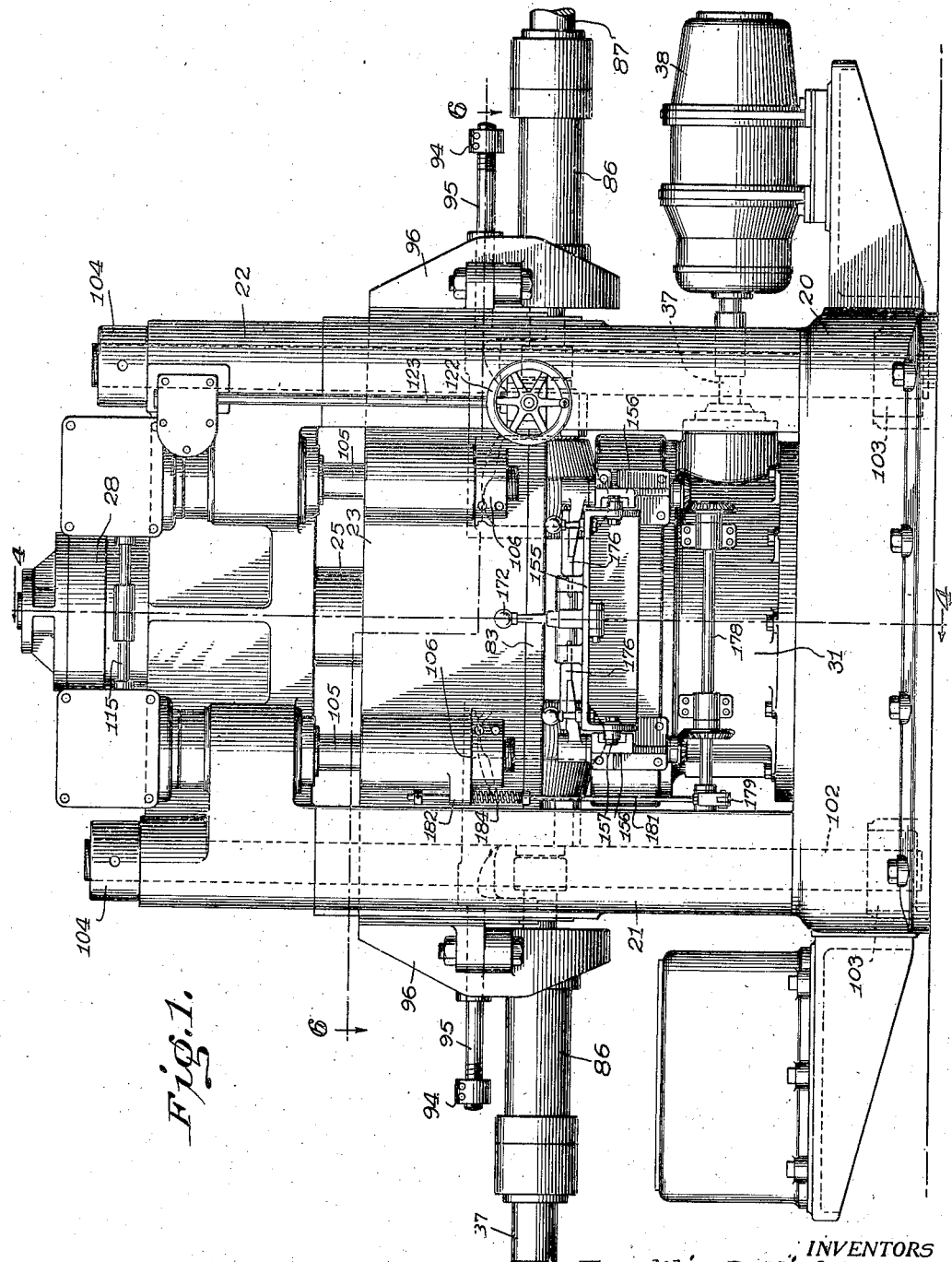
Fig. 1 is a front elevation of a mill constructed in accordance with one embodiment of this invention, taken from the operator's side of the mill and embodying an end view of the mechanism for handling and feeding blanks.
Figure 2:
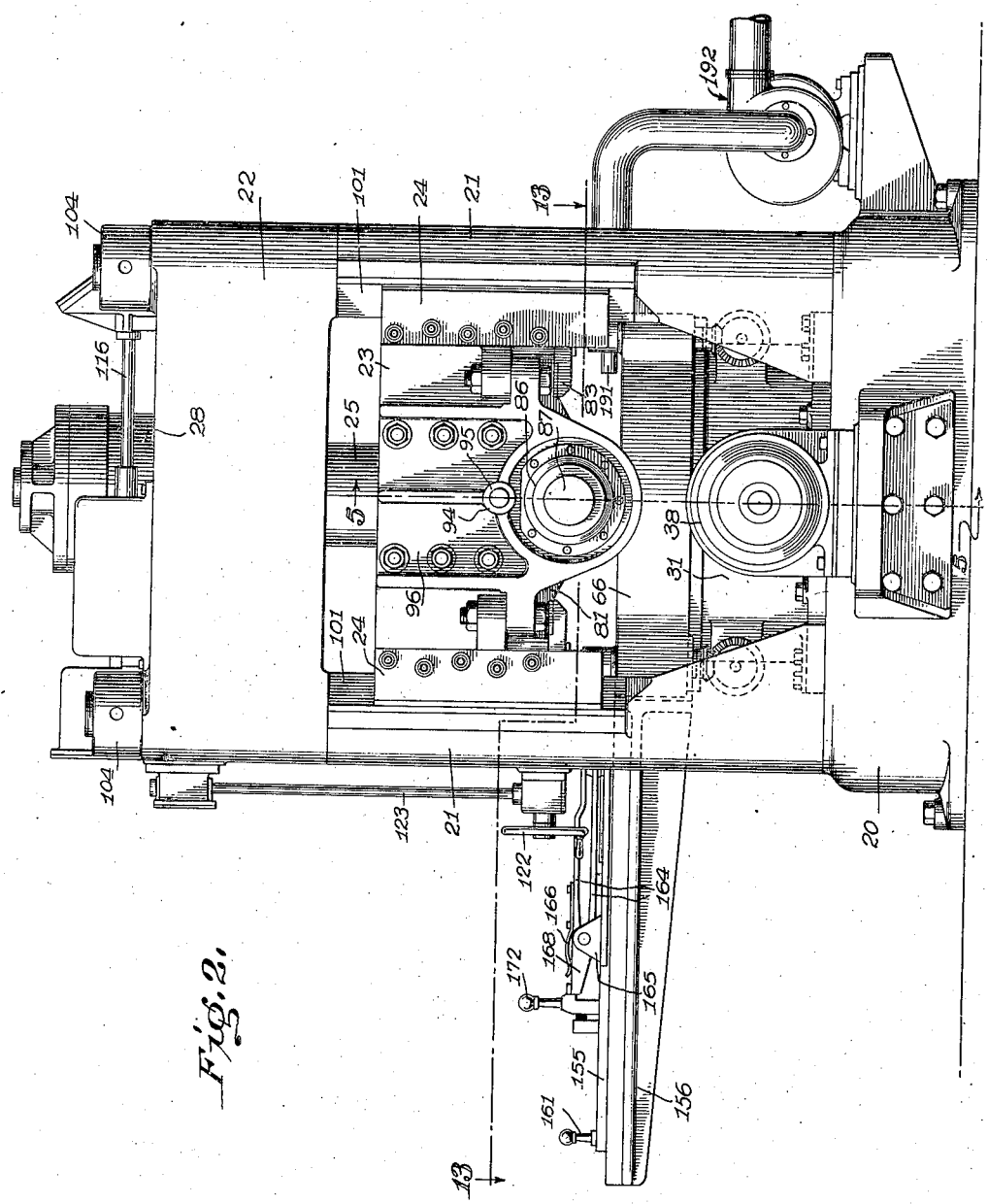
Fig. 2 is an elevation taken from the right of Fig. 1.
Figure 3:
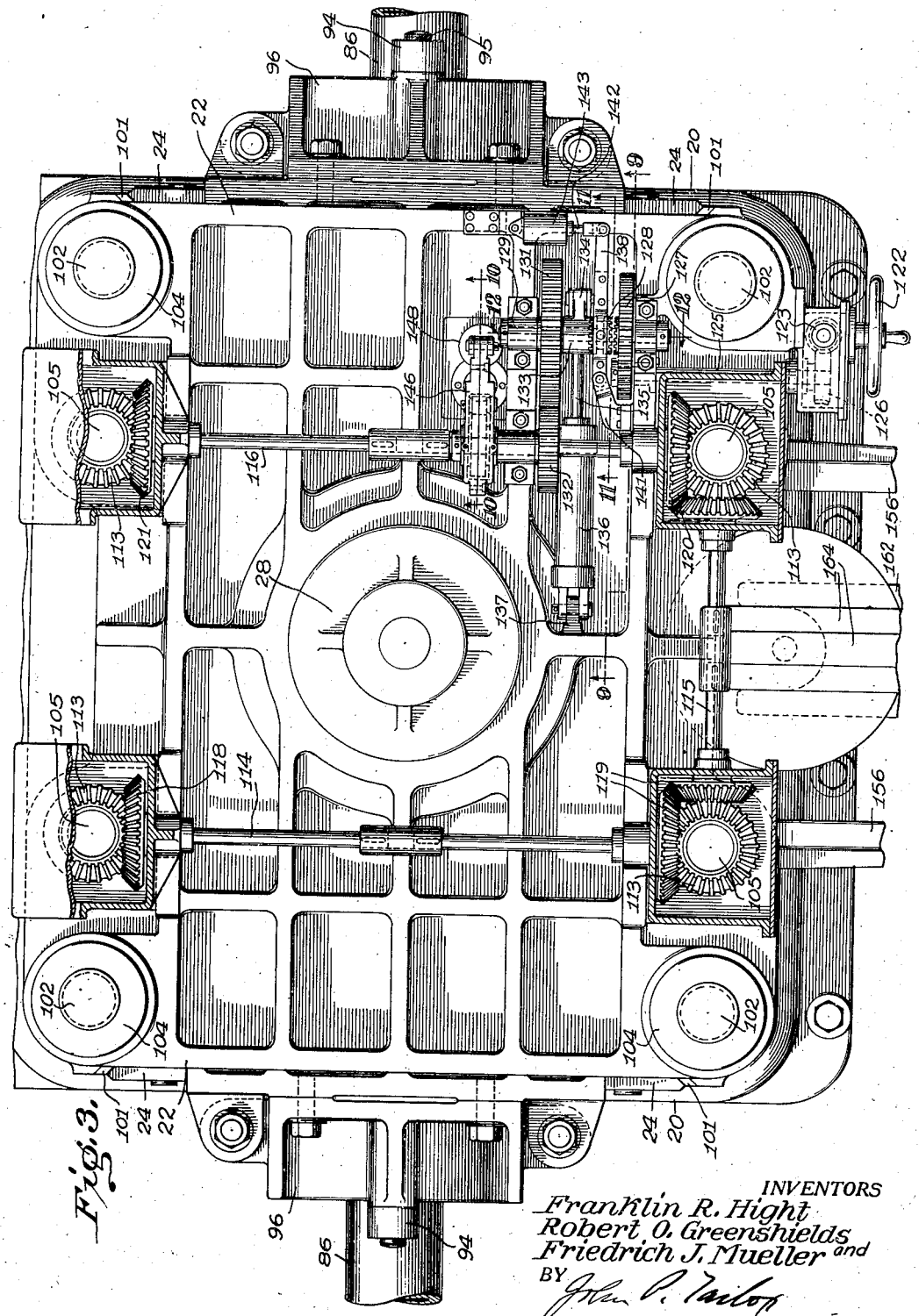
Fig. 3 is a top plan view of the mill shown in Figs. 1 and 2, parts being broken away and shown in section.

Figs. 9, 10, 11, and 12 are views showing various details of the mechanism for controlling the feed of the rolls and are taken on the section lines 9—9, 10—10, 11—11, and 12—12, respectively, of Fig. 3.

Fig. 13 is a plan view of the blank handling and feeding mechanism showing the same in inward position for placing a blank on the work table and removing a finished disc therefrom.

Fig. 14 is a section of the blank handling mechanism taken on line 14—14 of Fig. 13.

Fig. 15 is an end view taken from the left of Fig. 14.

Figure 16:
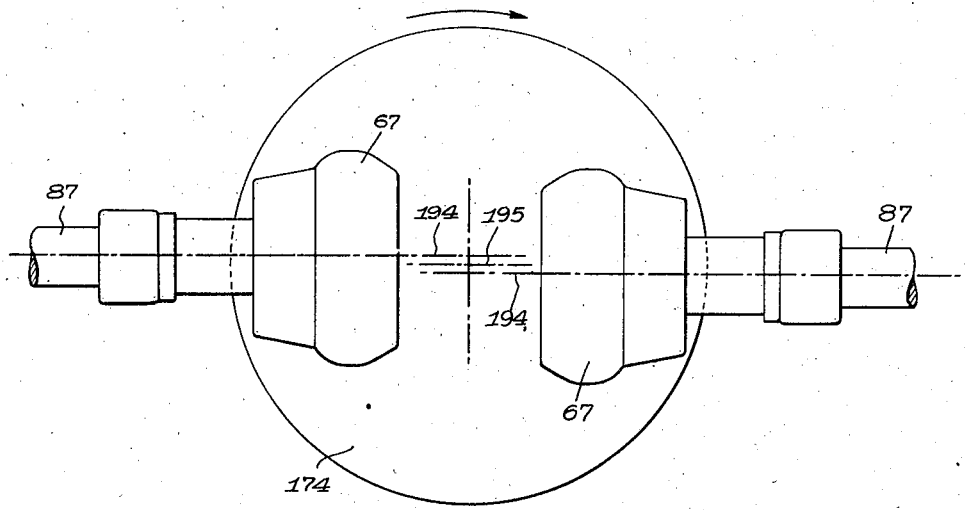

Fig. 16 is a diagrammatic plan view showing the offset rolling which the present machine is adapted to carry out.

Figure 17:
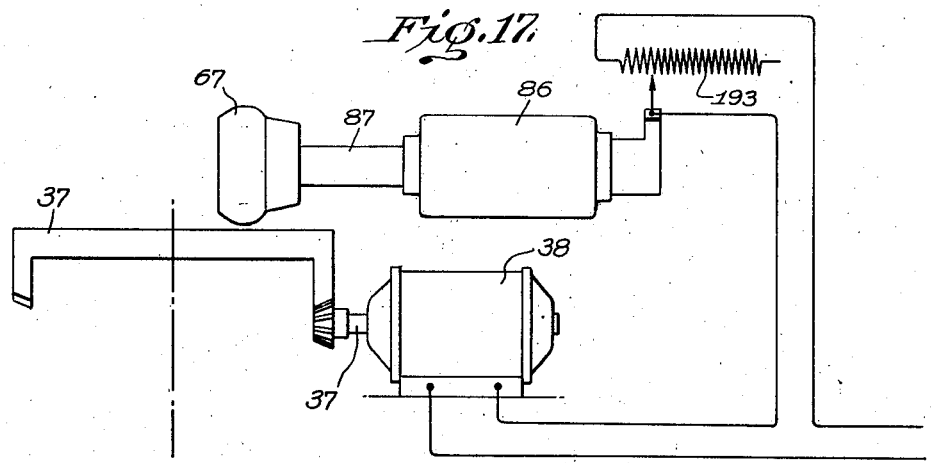

Fig. 17 is a diagram showing a detail, and

Fig. 18 is a diagram showing one arrangement of hydraulic pressure system which can be employed to operate the present machine.

The present invention comprises a mill for rolling relatively thin discs from flat blanks including a rotary work table or blank support for supporting a blank and rotating it about its center. One or more rolls mounted for rotation about horizontal axes are moved downwardly into rolling engagement with the blank adjacent its center and are then moved outwardly radially of the blank while in rolling contact therewith so as to spin and roll the material of the blank to form a relatively thin disc of greater diameter than the original blank. As is well-known in the art, the face of the work table or blank support may either be flat for rolling discs having parallel sides, or it may be of conical form to produce tapered discs. The rolls are slidably mounted for horizontal movement in the lower face of a vertically movable roll carriage which is preferably formed by a hydraulically operated ram, and mechanism is provided for accurately limiting downward movement of the carriage toward the blank support so that the size of the working pass between the roll and the support can be accurately controlled. Provision is made for subjecting each blank to a plurality of successive rolling passes and the feeding mechanism is automatically controlled to produce successive passes of decreasing size. After each pass the blank is relieved of the roll pressure and the rolls are moved back to the center of the blank while out of contact therewith. In each pass the thickness of the blank is decreased and the diameter increased and mechanism is provided for causing the rolls to move radially outwardly of the blank an increasing amount on successive passes, the increases corresponding generally with the increase in diameter of the blank. At the same time the speed of rotation of the work table or blank support is so controlled that the speed of the blank at the roll pass during movement of the rolls radially outward is maintained substantially constant so that the material of the blank near the center thereof is rolled at substantially the same rolling speed as the material near the periphery. Also, when a plurality of rolls are employed the mechanism for moving each roll radially of the blank during the rolling operation is so operated and controlled as to insure the rolls moving outwardly at substantially the same speed radially of the blank so as to substantially equalize the amount of work done by the different rolls.

The present invention also comprises a blank and disc handling mechanism of such character as to permit operation of the mill by a single operator. By means of this mechanism a finished disc is automatically raised above the blank support at the end of the rolling operation. The operator has, in the meantime, loaded the blank handling mechanism with a fresh blank. Upon operating the mechanism the fresh blank is deposited on the blank support in properly centered position for rolling, while the finished disc is grabbed by the mechanism and removed. Operation of the mill by a single operator at one side thereof leaves the opposite side of the mill free for such a device as a smoke hood for collecting and delivering to a suitable exhaust system smoke produced by the rolling operation. This smoke is caused by vaporization of lubricant applied to fresh blanks by the operator, the heat produced by the rolling operation causing the lubricant to vaporize.

The particular embodiment of the present invention, which has been chosen for the purpose of illustration and which constitutes one form of apparatus for carrying out the method of making wheel discs or the like disclosed and claimed in copending application, Serial No. 517,194, filed January 6, 1944, and entitled Method of rolling wheel discs, comprises a mill having a bed plate 20 on which are mounted vertically extending guide posts 21, shown as four in number, tied rigidly together at their upper ends by a press head 22. A vertically movable roll carriage 23 in the form of a hydraulic ram has bearing plates 24, see Fig. 6, for slidable guiding engagement with the posts 21, and is supported on the lower end of a fluid pressure piston 25 by a connecting ring 26 bolted to the carriage and engaging a groove 27 in the piston. The piston is operated by a fluid pressure cylinder 28 for hydraulic operation of the roll carriage 23.

A work table or a blank support is mounted on the bed plate 20 and comprises a housing 31 shaped to provide an inner annular flange 32 supporting a rotatable work table or blank support 33 secured by a clamping ring 34 to an annular base member 35 supported for rotary movement on annularly arranged roller bearings 36 which are mounted on the annular supporting flange 32. The table base 35 is rotated by a shaft 37 suitably geared thereto and driven from any suitable source of power such, for example, as an electric motor 38. As can be seen from Fig. 4, the blank supporting surface of the table 33 is of conical shape so that the finished disc will have a tapered cross section, as well-known in the art. Obviously, if a non-tapered disc is desired the work supporting surface will be flat.

Figure 4:
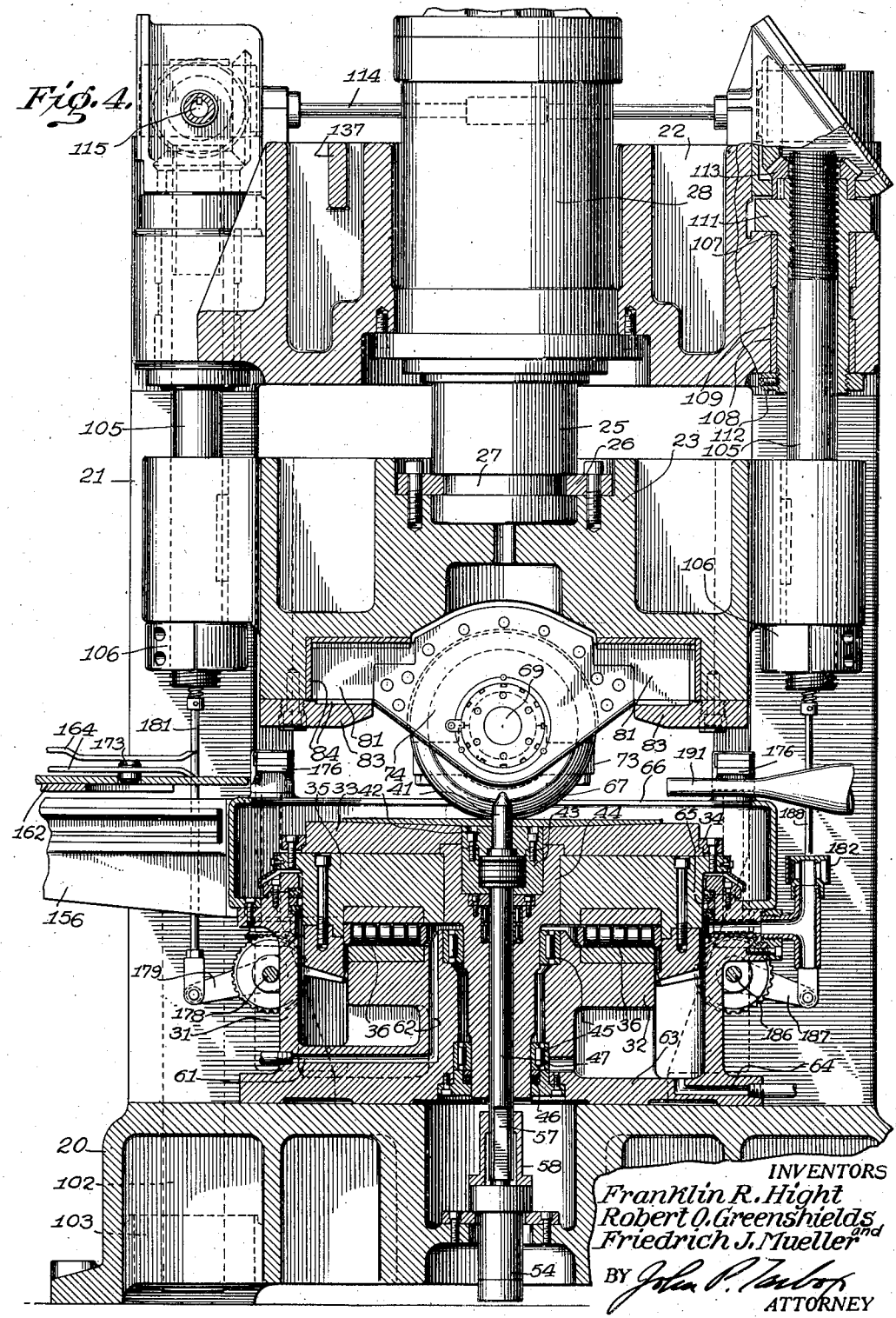
Fig. 4 is a vertical section on the line 4—4 of Fig. 1.
Figure 5:
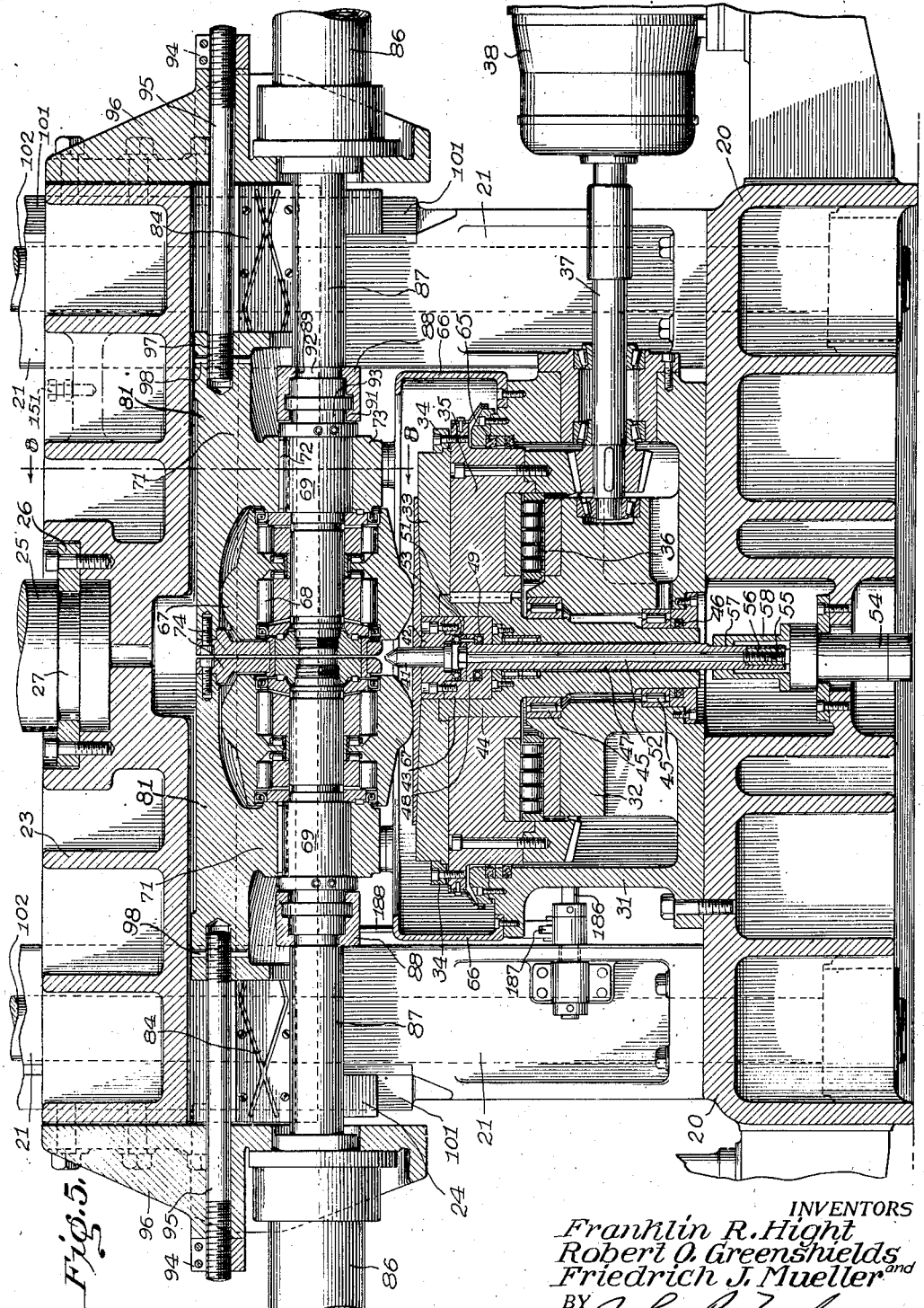
Fig. 5 is a sectional view on the line 5—5 of Fig. 2.

Each blank is formed with a central orifice and is centered on the work holder by a centering stud 41, see Figs. 4 and 5. The stud is mounted in a collar 42 bolted to a socket member 43 slidably fitting in a socket in the upper end of a sleeve 44 keyed in the central opening of the annular base member 35, and centered within the annular flange 32 by roller bearings 45. The annular space between the sleeve 44 and the surrounding flange 32 is sealed at the bottom by a packing gland 46. The blank centering stud 41, collar 42 and socket member 43 are vertically movable for the purpose of raising a finished disc above the blank support into position to be engaged by the blank handling mechanism hereinafter described. These parts are supported on the upper end of a tube 47 having a flange 48 at the top located in the socket member 43 with a ball race 49 between the flange and the bottom of the socket. A washer 51 keyed to the flange has a polygonally shaped opening for non-rotatably engaging the polygonal head of a central rod 52 extending downwardly through the tubular supporting member 47. A second roller bearing 53 is located between the washer 51 and collar 42. Vertical movement is imparted to the tube 47, centering stud 41 and associated parts by a fluid pressure mechanism including the cylinder 54 and piston 55, the latter having a threaded end connected to the lower threaded end of the central rod 52 by a threaded sleeve 56, the sleeve fitting into a recess formed on the lower end of the supporting tube 47. The tube 47 and central rod 52 are held against rotation, to prevent unthreading of the rod from the sleeve 56, by a flat face 57 on the tube engaging a similar face on a bracket 58 in which the tube is slidable.

The table supporting bearings are lubricated by oil delivered to the roller bearings 36 through passages 61 and 62, see Fig. 4, drilled in the housing 31. From the roller bearings it flows outwardly in each direction to the driving gear on one side and to the roller bearings 45 on the other, flowing ultimately into a sump 63 from which it is drained through passages 64. Packing 65, see Figs. 4 and 5, prevents oil from leaking upwardly around the work support. A splash pan 66 is secured to the base 31 and surrounds the rotary work support for the purpose of collecting any liquid, grease and the like, used on the blank and thrown off during rolling, to keep the same from entering the driving unit. The pan projects above the blank support a sufficient distance to prevent a blank being accidentally thrown out of the mill by the rotating support.

It should be noted that the entire work table assembly is easily removable from the mill laterally upon removing the bolts which secure the work support base 31 to the main bed 20, after the sleeve 56 has been unthreaded to permit the centering stud and the associated structure being lifted out of the annular sleeve 44.

Figure 7:
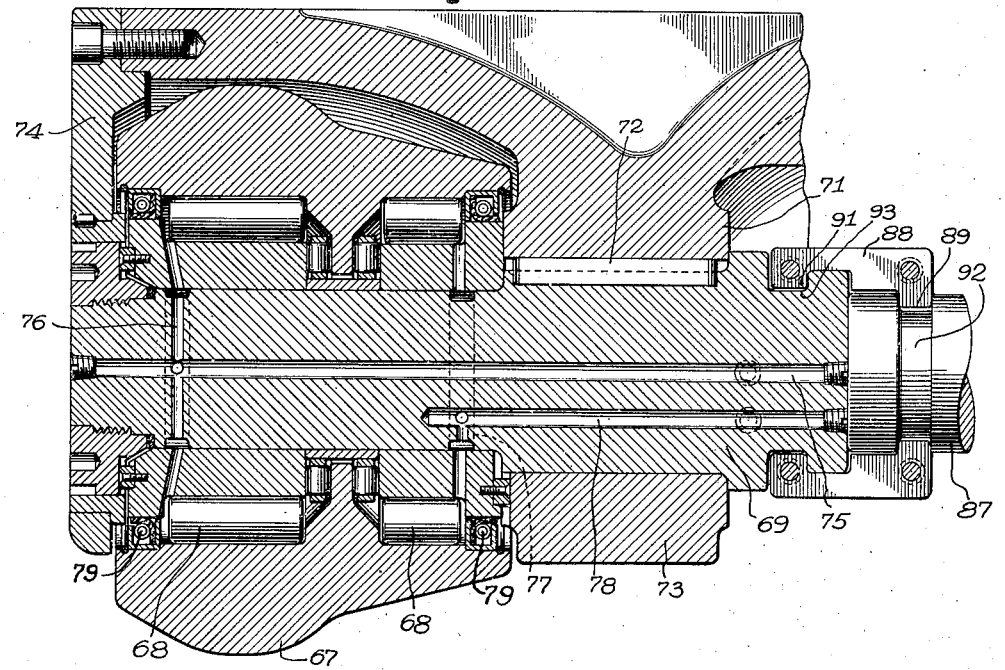
Fig. 7 is a vertical section, on an enlarged scale, of a roll mounting.

In the illustrated embodiment of the present invention are shown two oppositely disposed rolls 67 adapted to be moved into engagement with a blank near the center thereof, to be moved outwardly across the blank in a radial direction as the blank rotates, then to be lifted away from the blank to relieve it of rolling pressure and then to be returned inwardly to the starting point near the center of the blank. Each roll is supported through roller bearings 68 on the inner end of a shaft 69 keyed against rotation in a supporting bracket 71 by a key 72, see Fig. 8, and supported in place by a strap 73 bolted to the bracket 71. An end plate 74 supports the outer end of the roller shaft 69. Lubricant is fed through a supply passage 75, drilled in the roll supporting shaft 69, and flows through passages 76, roller bearings 68, see Fig. 7, thence through the rear roller bearings 68 and out through passages 77 and 78 drilled in the supporting shaft 69. The packing glands 79 are to prevent leakage between the ends of the roll and its supporting shaft. Other packing is provided to prevent leakage between the shaft and the end plate 74.

The shaft supporting bracket 71 forms part of a roll supporting slide 81 mounted for horizontal sliding movement on guide-ways 82 formed in the lower face of the vertically movable roll supporting ram or carriage 23, the slide being supported by clamps 83 bolted to the lower face of the carriage. The friction faces between the slide and guide-ways are provided with suitable wear plates or liners 84 having grooves 85 in the faces thereof for lubrication.

Mechanism is mounted upon and movable with the vertically slidable roll supporting carriage or slide 23 for moving the rolls horizontally on the carriage. As illustrated, this mechanism comprises a separate fluid pressure cylinder 86, associated with each roll, operating a piston 87 connected to the outer head of the roll shaft 69 by a flexible connection consisting of a split collar 88 surrounding the abutting ends of the piston rod and roll shaft and having annular flanges 89 and 91 engaging in grooves 92 and 93 on the piston rod and roll shaft, respectively, see Figs. 5 and 7. Inward movement of each roll on its supporting slide is limited by a stop nut or collar 94 secured to the outer end of a shaft 95 extending through bracket 96 secured to the vertically movable carriage 23, and threaded in a socket 97 in the roll slide 81. A pin 98 locks the stop shaft 95 in the socket. It will be apparent that the position of the stop collar or nut 94 on the shaft 95 will definitely limit the inward movement of the roll and determine the point on the disc near the center thereof at which the rolling operation will begin. Adjustment of the collar on the shaft will vary the point at which the rolls engage the blank. Vertical movement of the roll carriage or slide 23 is effected by hydraulic pressure through the piston and cylinder 25 and 26. This movement is accurately guided by the bearing plates 24 engaging guide faces formed by wear plates 101 on each post 21, see Fig. 6. The cylinder 26 is rigidly bolted to the press head 22 which is supported upon the posts 21. The press head and posts are rigidly connected to the bed plate 20 by tie rods 102 which extend through the bed plate, posts 21 and press head 22, and the assembly is rigidly clamped together under considerable pressure by clamping collars 103 and 104 threaded to the lower and upper ends, respectively, of the tie rods 102. Accordingly, the tie rods 102 are maintained in a state of tension at all times.

Mechanism is provided for determining and limiting the downward movement of the rolls toward the blank support for the purpose of determining the size of the roll pass and this mechanism is such that, if desired, the rolls can be fed nearer to the support to reduce the size of successive roll passes when a plurality of passes are employed. As illustrated, this mechanism comprises a plurality of screw shafts 105, extending through and keyed to the vertically movable roll carriage or slide 23 and provided with stop collars 106 secured to the lower ends thereof for limiting the downward movement of the slide and supported rolls. By raising or lowering the screw shafts 105 and supported collars 106, the extent of downward movement of the rolls can be accurately controlled. Each shaft 105 is keyed to the slide 23 and is adapted to be vertically adjusted by a sleeve 107 threaded to the shaft and rotatably mounted in the press head 22, bearing sleeves 109 being provided. The threaded sleeve has a collar 111 at one end and a collar 112 threaded thereto at its lower end to prevent longitudinal movement of the sleeve in the press head. A bevel gear 113 is keyed to the upper end of the sleeve 107.

The gears 113 associated with the different shafts 105 are interconnected for simultaneous and equal movement by shafts 114, 115, and 116, see Fig. 3, and gear 118, 119, 120, 121 mounted on the respective shafts and meshing with the various gears 113. The shaft 116 is provided with mechanism for rotating the same to raise and lower the stops 106. Means are provided for adjusting the stops manually to set the same at the beginning of the rolling operation, and additional means are provided for automatically adjusting the stops during continued rolling.

Figure 6:
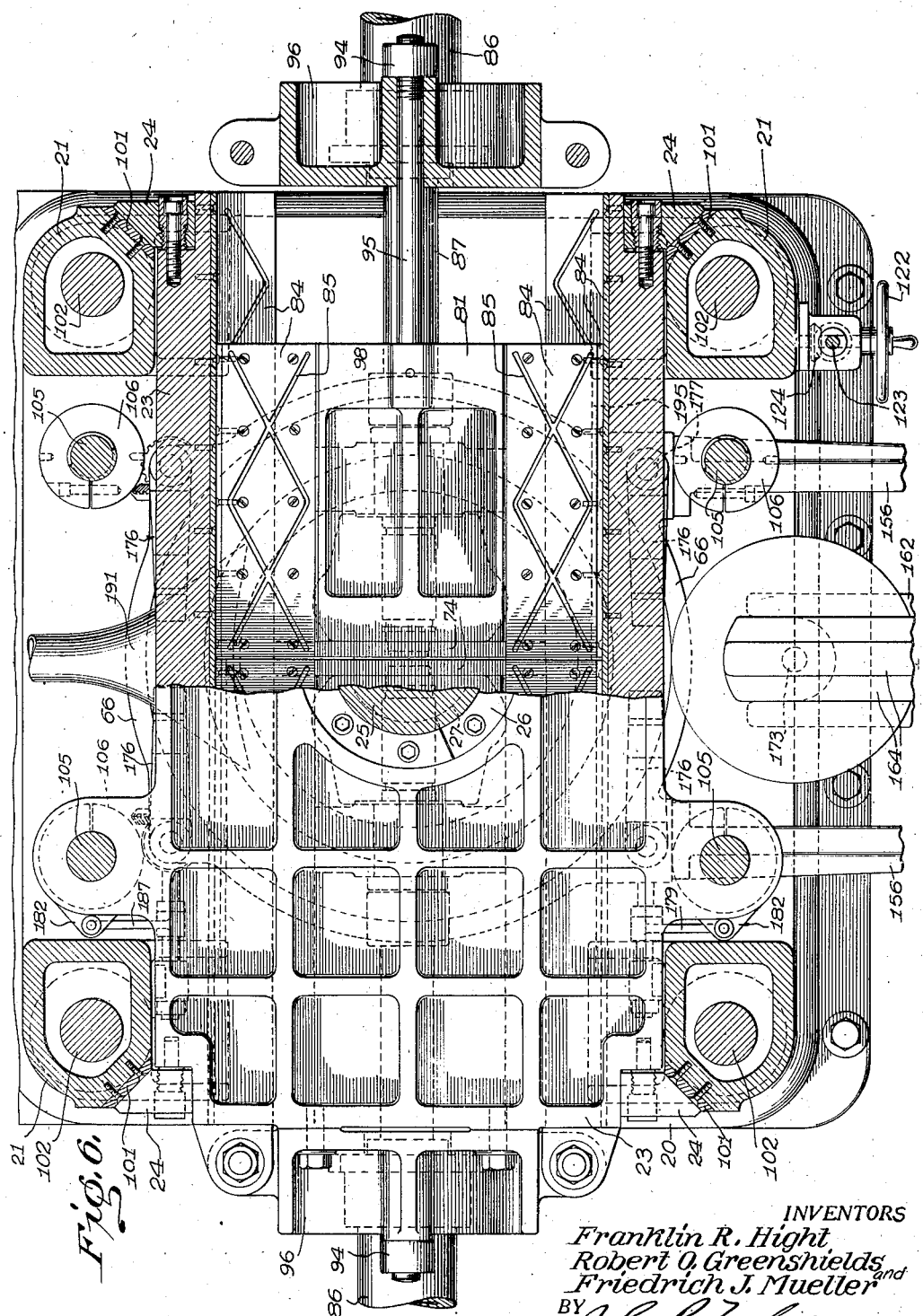
Fig. 6 is a horizontal section on the line 6—6 of Fig. 1.

As illustrated, a hand wheel 122 rotates a vertical shaft 123 through gears 124, see Fig. 6. The shaft 123 is connected to a shaft 125 through a worm gear 126. The shaft 125 is geared to a gear 127 having clutch teeth adapted to engage similar teeth on one side of a clutch collar 128 feathered to a countershaft 129 which is in turn connected to the shaft 116 through gears 131—132, see Figs. 3 and 12. The opposite side of the clutch collar 128 has teeth adapted to engage corresponding teeth on a collar 133 rotatably mounted on the shaft 129 and having a crank arm 134 connected to the outer end of a piston rod 135 projecting outwardly from a cylinder 136 for a purpose to be hereinafter described. The cylinder is pivoted on a bracket 137, see Figs. 3 and 9. The clutch collar 128 is controlled by a lever 138 pivoted at one end on a bracket 141 and connected at its other end with the projecting end of a piston 142 projecting outwardly from a fluid pressure cylinder 143 which is under the control of the operator.

The mechanism for feeding the limiting stops 106 downwardly so as to reduce the size of successive passes includes a ratchet 144, see Fig. 10, keyed to the gear shaft 116 and actuated by a pawl 145 mounted on actuating lever 146, the outer end of which is connected to the end of a piston 147 projecting upwardly from a fluid pressure cylinder 148 pivoted to the upper cross head 22. After each roll pass, pressure is delivered to the cylinder 148 to draw the piston 147 downwardly, rotating the shaft 116 and through the gearing connection above described to rotate the threaded sleeves 107 and lower the vertical screw shafts 105 and stops 106 a predetermined amount.

After the final finishing pass, the roll carriage 23 is lifted vertically to its uppermost position to permit removal of the finished disc. This upward movement is employed for returning the stops to their original starting position for the first pass on the succeeding workpiece. As illustrated, this comprises an adjustable screw threaded stud 151 adjustably mounted in the top of carriage 23 in position to engage the lower projecting end of a pin 152 normally pressed downwardly by a helical spring in a cylinder 154 bolted to the upper cross head 22. The upper end of the pin projects through the cylinder in position to engage the heel of the pawl 145 to release the ratchet 144 therefrom, leaving the shaft 116 free to turn. The operator, through a suitable valve, not shown, then delivers air to the cylinder 136. The clutch collar 128 being in engagement with the clutch 133 connected to the piston 135, the shaft 116 is rotated through gearing 132 to return the stops 106 to their starting position.

After completion of the finishing pass and upon the raising of the roll carriage 23 to its uppermost position, the finished disc is removed from the support 33 and a fresh blank is substituted therefor. In the present invention a blank handling mechanism operatable from one side of the mill by a single operator, is provided for both removing the finished disc and inserting the unrolled blank. This mechanism is shown as comprising a slide 155 slidably mounted at each side on guide rails 156 by means of rollers 157 secured to the downwardly depending sides of the slide 155 and mounted between wear plates 158 supported in the guide rails. Handles 161 are provided for the operator to move the slide 155 back and forth. The slide is provided with a blank supporting plate 162 having a perforated end 163 adapted to support and position the blank over the blank centering stud 41. A pair of finished disc engaging fingers 164 are pivoted to a bracket 165 on the slide 155. The upper finger is spring pressed toward the other by a flat spring 166. The fingers are vertically movable around the supporting pivot 167 and are releasably held in raised position, shown in dotted lines in Fig. 14, by an arm 168 formed integrally with the lower finger and extending rearwardly to a position to be engaged by a spring pressed latch 169 pivoted to the slide and normally pressed into arm engaging position by a coil spring 171, a handle 172 being provided for releasing the arm 168.

The lower finger 164 has a stud 173 projecting below the finger for engagement with the central orifice of a blank 174 positioned on the blank supporting plate 162, and projecting above the lower finger for engagement in the central orifice of a finished disc 175, see Fig. 14. After completion of a rolling operation the centering stud 41 and collar 42 are raised as shown in dotted lines in Fig. 14 to lift the finished disc 175 to the position shown in full lines, the slide 155 and work handling mechanism being retracted outwardly, to the left in Fig. 14. A plurality of disc supporting fingers 176 are rotatably mounted on shafts 177. The supports and shafts are shown as four in number. The two at the front of the work support are geared to a countershaft 178 adapted to be oscillated by a crank 179 secured to the shaft and connected to a rod 181 extending upwardly through a lug 182, see Fig. 15, on the vertically movable roll supporting slide 23. A nut 183, or the like, is secured to the upper end of the rod 181 above the lug 182 so that the rod 181 is raised on upward movement of the carriage 23. Downward movement of the carriage 23 yieldingly presses the rod 181 downwardly by means of a helical spring 184 surrounding the rod between the lug 182 and a spring holding nut, or the like, 185 secured to the rod. The two fingers at the rear are similarly actuated by gearing connecting the vertical disc supporting shafts 177 to a countershaft 186 and a crank arm 187 secured to the lower end of operating rod 188 extending upwardly through the roll supporting slide and adapted to be yieldingly pressed downwardly by a helical spring 189 in the same manner as described in connection with the rod 181. It will be apparent that at the end of a rolling operation, upward movement of the carriage 23 raises the rods 181 and 188 to rotate the disc supporting fingers 176 inwardly to disc engaging position in Figs. 14 and 15, this occurring after the stud 41 and collar 42 have raised the finished disc above the blank support or roll table 33 in position to be engaged and supported by the fingers.

By constructing the mill for operation by a single operator, the space at the back of the mill is left free and can be provided with a hood 191 connected to any suitable exhaust mechanism 192 for removing smoke produced during rolling by vaporization of the lubricant placed on the blanks by the operator.

The operator first places a fresh blank 174 on the supporting plate 162. The stud 173 projecting below the lower finger 164 is pressed into the central orifice in the blank for centering and holding the same in proper position. The operator then moves slide 155 and the associated work handling mechanism inwardly to the position shown in Fig. 14. Upon moving inwardly the fingers 164 clasp the finished disc 175 which is being held upon the supporting fingers 176 and the stud 173 projecting above the lower finger 164 engages in the central orifice of the finished blank. It should be stated, that prior to moving the work handling mechanism inwardly to the position illustrated in Fig. 14, but after the finished disc has been engaged by the supporting fingers 176, the disc centering stud 41 and elevating collar 42 have been withdrawn to the full line position shown in Fig. 14 so as to permit the inward movement of the work handling mechanism and the fresh blank supported thereon. After the work handling mechanism is moved inwardly to center the fresh blank over the centering stud 41, the latter is again automatically elevated to the position shown in dotted lines in Fig. 14. This projects the centering stud 41 upwardly through the central orifice in the blank 174 causing it to abut against the stud 173 and raise the fingers 164 and the finished disc engaged thereby into the dotted line position illustrated. When in this position the latch 169 snaps over the rear edge of the arm 168 and holds the fingers and disc in elevated position. Thereupon the operator retracts the entire mechanism outwardly. The fresh blank is, however, held against withdrawal by the centering stud 41 extending through the central opening in the blank. As the supporting plate 162 is withdrawn from under the blank the latter drops on to the collar 42. The centering stud 41 and collar 42 then being lowered, the blank is located in properly centered position on the roll table or blank support 33. When the slide 155 is retracted to its extreme outermost position the finished disc 175 can be easily removed from the supporting fingers by the operator. A fresh blank is then placed on the table 162 after which the latch 169 is released by moving it against the pressure of the spring 171, permitting the fingers to drop into their lower position and placing the blank centering stud 173 in the central opening of the new blank.

Assuming that a fresh blank has just been placed on the blank support 33, the operator manually sets the position of the roll limiting stops 106 by first admitting fluid to the fluid pressure cylinder 143, see Fig. 3, to throw the clutch collar 128 so as to connect the hand wheel 122 with the stop controlling shaft 116. The first position of the stops 106 which determines the roll pressure and the size of the first roll pass is thus set manually in accordance with the thickness of the blank to start with. A dial, not shown, can be connected to the stop setting shaft to guide the operator in this preliminary setting. The clutch 128 is then shifted to connect the shaft 129 with the piston rod 135 through the clutch collar 133. Pressure is then admitted to the main cylinder 28 and the roll supporting carriage 23 and rolls 67 are lowered, the fluid pressure cylinders 86 and pistons 87 having been operated so as to move the rolls inwardly to their innermost position as determined by the stops 94 on the ends of the rods 95, see Fig. 5. The blank support or roll table 33 is rotated continuously. After the rolls are brought into engagement with the blank near the center thereof, the fluid pressure cylinders 86 and pistons 87 are operated to move the rolls radially outwardly across the blank during the rolling operation to perform a combined spinning and rolling operation. The rolls are preferably moved outwardly to approximately the edge of the blank, spinning and rolling the material of the blank in such a way as to reduce the thickness thereof and enlarge the diameter. The outward movement of the rolls is accurately determined by fluid pressure control. At the end of the pass the carriage 23 and supported rolls are raised a small amount, approximately ⅛ to ¼ of an inch, to relieve the disc of rolling pressure and to permit the rolls to be moved inwardly again to the center of the disc without causing them to backtrack in contact with the material thereof. During this period the fluid pressure cylinder 148, see Fig. 10, is actuated to operate pawl and ratchet 144 and 145 so as to index the limiting stops 106 downwardly to permit the rolls to approach more closely to the work support to form a second pass somewhat narrower than the first pass. When the carriage 23 is again lowered to bring the rolls into engagement with the blank, the latter are again moved outwardly on the second pass. This rolls the disc into a still thinner form with a still larger diameter. The hydraulic control is such that the outward movement of the rolls on the second pass in contact with the disc is sufficiently greater than on the first pass to accommodate and roll the increased diameter of the disc.

This operation can be repeated any desired number of times so as to subject a blank to any given number of roll passes. It will be desirable usually to make each pass successively smaller, but it will be apparent that reduction in the size of the different passes is a selective operation and successive passes of substantially the same size can be employed if, for any reason it is desirable to do so. The hydraulic control is such that both rolls are caused to move outwardly during each pass at the same speed so that the work done is substantially equally divided between the different rolls. At the same time, any suitable speed control mechanism can be employed in connection with the motor for rotating the work support so that the speed of rotation of the latter is gradually reduced during the rolling of each pass in such a way as to maintain the speed of the disc at the point of contact with the rolls substantially constant from beginning to end of any given pass. For example, a resistance 193, see Fig. 17, in the circuit of the table driving motor 38 can be controlled by the roll operating piston so as to increase the circuit resistance during rolling to gradually decrease the motor speed as the roll is moved outwardly across the blank. After a pass is finished, the speed of rotation of the work support is again raised to correspond with the beginning of the succeeding roll pass.

It will be apparent that the rolls follow a substantially rectilinear path during the rolling of a given blank and the blank is subject to a succession of passes in which the contact of the rolls therewith is always from the center outwardly.

Preferably, the rolls contact the blank in such a way that the angle of attack of the material toward the rolls is from the rear or the outside of the rolls. This is preferably accomplished by so mounting each roll that it moves outwardly of the blank along a line 194 which is offset from, preferably in the direction of rotation, but parallel to, a diametral line 195 passing through the center of the blank, as illustrated in Fig. 16. Obviously, other arrangements for accomplishing the same result are possible. Also, each roll might be moved along a line offset in the opposite direction from the diametral line, or moved outwardly along a diametral line but positioned at an angle thereto. With such an arrangement the angle of attack would remain constant throughout the roll pass.

Figure 8:
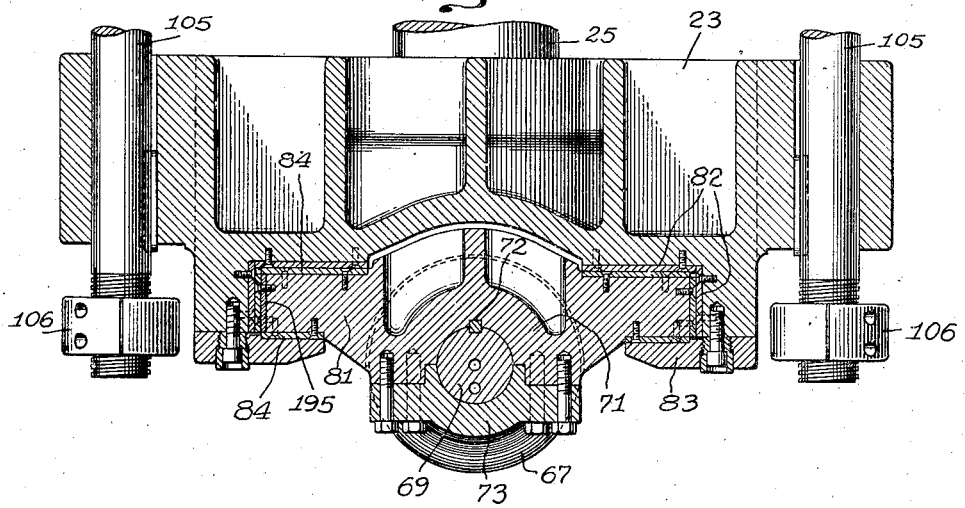
Fig. 8 is a section on the line 8—8 of Fig. 5.

Mounting each roll for movement along a line offset from but parallel to a diametral line can be accomplished in any desired manner. As illustrated in Fig. 8, a steel backing plate 195 is placed in back of the lubricated friction plate 82 at one side of the horizontal roll slide 71, the parts being so formed that with the plate in the position shown, the roll is offset from the diametral line in the direction of the plate a predetermined amount such, for example, as ¼ of an inch. If a greater distance of offset is required, it can be obtained by removing the steel backing plate, shifting the roll slide and inserting the backing plate in back of the friction plate on the opposite side of the horizontal slide. Obviously, other arrangements can be employed.

At the end of a predetermined number of passes, when the rolling operation has been completed, the carriage 23 is raised upwardly to the extreme limit of its upward movement. At the same time, fluid pressure cylinder 54, see Fig. 5, is actuated to elevate the centering stud 41 and collar 42 to raise the finished disc into position to be engaged by the supporting fingers 176 which are moved inwardly to disc supporting position by the head 23 engaging the nuts 183, see Fig. 15, at the limit of its upward movement. The finished disc is removed and a fresh blank delivered to the mill by the operator in the manner above described in connection with the blank handling mechanism.

It will be apparent that various systems of hydraulic control can be employed for operating a mill in the manner set forth.

One such system is diagrammatically shown in Fig. 18 and comprises a motor 200 operating a pump 201 for pumping fluid such as oil from a sump or oil reservoir 202 through a line 203, low pressure unloader 204, check valve 205 and pressure line 206 to a solenoid operated four-way valve 207. The valve 207 is connected by line 208 to the pressure cylinder 29 above the head of the piston 25, and by line 209 to the cylinder 28 below the piston head. The four-way valve is adapted to be operated in the usual manner by solenoids 211 and 212 to connect the pressure supply line 206 with one or the other of the cylinder operating lines 208 or 209, and to connect the other of such lines with the discharge line 213 leading to the oil reservoir. The low pressure unloader valve 204 is also connected to the pressure supply line 206 by line 214, and a discharge line 215 connects the unloader with the oil reservoir. The motor 200 is provided for rapid traverse of the roll carriage 23 supported on the piston 25. It may be a 10 H. P. motor and the pump 201 have a capacity of approximately 20 gallons per minute. A pressure gauge 216 is connected to the pressure supply line 206 through a gauge cock 217.

A second motor 218 is provided to apply rolling pressure to the rolls through the piston 25. It drives a smaller capacity pump 219 for delivering fluid pressure from the oil reservoir through a connecting line 221, check valve 222 and unloader valve 223 to the supply line 206 leading to the four-way valve 207. The motor 218 is preferably of about 5 H. P. and the pump 219 has a capacity of about 2½ gallons per minute. A line 224 connects the pump 219 with the operating chamber of the unloader valve 223 so that when the pressure on the pump 219 reaches a certain maximum the unloader 223 is operated to connect the pump supply line 221 with the oil reservoir through a discharge line 224' and relieve the line 206 of excess pressure.

Operation of the above-described mechanism is controlled through a conventional type of electrical system, not shown, by means of which the piston 25 causes the four-way valve operating solenoids 211 and 212 to be alternately energized for alternately connecting the pressure line 206 with the line 208 for lowering the piston and with the line 209 for raising the piston, all in proper timed relation to the rolling cycle. A piston operated switch 225 controls the solenoid 212 and a second switch 226 controls the solenoid 211, the switches being actuated by suitable arms 227 and 228, or the like, connected to the piston 25.

For operating the roll shifting cylinders 86 a motor 231 of approximately 25 H. P. drives a pump 232 of about 36 gallons per minute capacity for delivering fluid pressure through a supply line 233, check valve 234, and unloader valve 235 to a solenoid operated four-way valve 236 adapted to be actuated by solenoids 237 and 238 to deliver fluid pressure through a pressure building valve 239 and line 241 to interconnected fluid motors 242 by means of which equal volumes of fluid are delivered through lines 243 and 244 to the opposite cylinders 86 to move the pistons 87 outwardly during the rolling operation so as to move the rolls across the surface of a blank being rolled at equal speeds whereby the work of rolling is equally divided between the different rolls. A discharge line 240 connects the unloader valve 235 with the reservoir 202. The solenoid operated four-way valve 236 is also adapted to connect the pressure supply line 233 with a line 245 for delivering fluid pressure to the outer ends of the cylinders 86 for moving the pistons 87 and rolls inwardly to their starting points. It is to be noted that the two sections of each piston rod 87 are of different diameters so that the inward movement of the pistons and rolls will be at a relatively high speed and the outward working movements at a considerably reduced speed. A speed regulator 246 is connected across the lines 241 and 245 for controlling the volume flow therein. A series of switches 247 actuated by a switch arm 248 movable with one of the pistons 87 are so arranged as to control the energizing and de-energizing of the solenoids 237 and 238 so that the pistons are moved in and out during a rolling operation to impart to the rolls the movements herein above described, whereby on successive passes the rolls move outwardly increasing distances corresponding with the increasing diameter of the blank being rolled. A pressure operated switch 251 is connected to the cylinder 28 above the piston 25 to stop operations if the pressure builds up above a predetermined maximum.

Various electrical control systems can be employed and it is not necessary to illustrate or describe them in connection with this disclosure inasmuch as they form no part of the present invention.

Although we have described in detail one specific arrangement of rolling mill, it will be apparent that the present invention can be variously modified and adapted within the scope of the appended claims.

What we claim is:

1. A rolling mill comprising a work support, a roll for forming a blank on said work support, a vertically movable roll supporting carriage, means for reciprocating said carriage vertically, a stop for limiting the downward movement of said carriage, screw means for adjusting and determining the position of said stop, means for manually operating said screw means to limit the first downward movement of said carriage and determine the size of the first roll pass, and means operated by the reciprocation of said carriage for adjusting said stop to reduce the size of succeeding working passes of said roll.

2. A rolling mill comprising a work support, a roll for forming a blank on said work support, a vertically movable roll supporting carriage, means for reciprocating said carriage vertically, a stop for limiting the downward movement of said carriage, screw means for adjusting and determining the position of said stop, means for manually operating said screw means to limit the first downward movement of said carriage and determine the size of the first roll pass, and means for returning said stop to starting position after each disc rolling cycle.

3. A rolling mill comprising a work support, a roll for forming a blank on said work support, a vertically movable roll supporting carriage, means for reciprocating said carriage vertically, a stop for limiting the downward movement of said carriage, screw means for adjusting and determining the position of said stop, means for manually operating said screw means to limit the first downward movement of said carriage and determine the size of the first roll pass, and means operated by the reciprocation of said carriage for adjusting said stop to reduce the size of each successive working pass of said roll.

4. A rolling mill comprising a work support, a roll for forming a blank on said work support, a vertically movable roll supporting carriage, means for reciprocating said carriage vertically, a stop for limiting the downward movement of said carriage, a screw shaft for adjusting and determining the position of said stop, means for manually operating said screw shaft for positioning said stop, means operated by the reciprocation of said carriage for rotating said shaft to move said stop, and a clutch for selectively connecting said manual operating means to or disconnecting it from said screw shaft.

5. A rolling mill comprising a work support, a roll for forming a blank on said work support, a vertically movable roll supporting carriage, means for reciprocating said carriage vertically, a stop for limiting the downward movement of said carriage, means for adjusting the position of said stop, means for manually operating said adjusting means so as to set said stop to limit the downward movement of said carriage and determine the size of the first roll pass between said roll and said work support, a pawl and ratchet mechanism actuated by the reciprocation of said carriage for operating said adjusting means to reduce the size of succeeding working passes of said roll, and means for selectively connecting said manually operated means to or disconnecting it from said adjusting means.

6. A rolling mill comprising a work support, a roll for forming a blank on said work support, a vertically movable roll supporting carriage, means for reciprocating said carriage vertically, a stop for limiting the downward movement of said carriage, a screw shaft for adjusting the position of said stop, a gear train for operating said screw shaft, a hand wheel for operating said gear train, a pawl and ratchet mechanism actuated by the reciprocations of said carriage for operating said gear train, and a manually controlled clutch for selectively connecting said hand wheel to or disconnecting it from said gear train.

7. A rolling mill comprising a work support, a roll for forming a blank upon said support, a vertically movable roll supporting carriage, means for raising and lowering said carriage to move said roll into and out of working engagement with a blank on said support, guide posts for guiding the movement of said carriage, screw shafts, stop members threaded to said shafts and positioned to limit the downward movement of said carriage thereby to determine the dimension of the pass between said roll and said work support, and means for operating said screw shafts in timed relation to the movement of said carriage to position said stop members and limit the movement of said carriage at any predetermined point.

8. A rolling mill comprising a work support, a roll for forming a blank upon said support, a vertically movable roll supporting carriage, means for raising and lowering said carriage to move said roll into and out of working engagement with a blank on said support, guide posts for guiding the movement of said carriage, screw shafts, stop members threaded to said shafts and positioned to limit the downward movement of said carriage thereby to determine the dimension of the pass between said roll and said work support, and means operated by the movement of said carriage for moving said stop members to progressively change the limit of movement of said carriage.

9. A mill for rolling discs comprising a support for a blank having a central perforation, a roll for forming a blank on said support into a finished disc, means including a vertically movable pin adapted to enter the perforation of said disc for raising a finished disc above said support, means for holding said finished disc in raised position, and a blank handling mechanism movable toward and from said support, including means for positioning a blank on said support, and means for gripping a finished disc in said raised position to retract the same, after lowering of said pin, upon movement of said mechanism away from said support.

10. A mill for rolling discs comprising a support for a blank having a central perforation, a roll for forming a blank on said support, means for raising a finished disc above said support, means for holding said disc in raised position, a blank handling mechanism movable toward and from said support including a blank supporting plate adapted to position a blank on said support, gripping means adapted to engage the finished disc in its raised position, and a blank centering pin movable into the perforation of said blank for retaining the same on said support upon movement of said mechanism away from said support.

11. A mill for rolling discs comprising a support for a blank having a central perforation, a roll for forming a blank on said support, means for raising a finished disc above said support, a plurality of rotatably mounted fingers movable into position to hold said disc in raised position, a blank handling mechanism movable toward and from said support including a blank supporting plate adapted to position a blank over said support, a blank centering pin movable into the perforation of said blank to hold same on said support, upon retraction of said plate, flexible disc gripping arms movable into position to engage said disc upon movement of said mechanism toward said support, means on said arms for engaging said perforation on said disc, said pin being movable to elevate said arms to raise said disc away from said supporting fingers, and means for releasably holding said arms in elevated position to permit removal of said disc upon movement of said mechanism away from said support.

12. A mill for rolling discs comprising a support for a blank having a central perforation, a roll for forming a blank on said support, means including a pin cooperating with the perforation in a blank for centering a blank on said support, a plurality of rotatably mounted fingers movable into position to hold said disc in raised position, a blank handling mechanism movable toward and from said support including a bifurcated blank supporting plate adapted to be moved inwardly so as to position a blank over said pin when said pin is retracted, flexible disc gripping arms provided with a perforation engaging stud movable into position to engage said disc in raised position upon movement of said mechanism toward said support, means for raising said pin through the perforation on said blank to engage said stud and elevate said arms to raise said disc away from said supporting fingers, and means for releasably holding said arms in elevated position to permit removal of said disc upon movement of said mechanism away from said support.

13. A mill for rolling discs comprising a support for a blank having a central perforation, a roll for forming a blank on said support, a vertically movable roll supporting carriage for moving said roll into and out of rolling engagement with a blank on said support, means for raising a finished disc above said support, a plurality of rotatably mounted fingers movable into position to hold said disc in raised position, a blank handling mechanism movable toward and away from said support including a blank supporting plate adapted to position a blank over said support, a blank centering pin movable into the perforation of said blank to hold same on said support on retraction of said plate, flexible disc gripping arms movable into position to engage said disc upon movement of said mechanism toward said support and to remove the disc from said fingers upon movement of said mechanism away from said support, and means actuated by the movement of said roll supporting carriage for moving said fingers into and out of disc holding position.

14. A rolling mill comprising a work support, a vertically movable carriage above said work support, a transversely movable roll supporting slide mounted on said carriage for horizontal movement, a roll supporting shaft mounted in said slide, a roll on said shaft for forming a blank on said work support, mechanism for moving said roll and slide radially of said carriage including a fluid pressure mechanism having a piston rod in line with said roll shaft, and a flexible connection between said piston rod and said roll shaft, including a split collar surrounding the abutting ends of said rod and shaft and having flanges engaging grooves therein.

15. A rolling mill comprising a bed, a work support on said bed, a roll supporting carriage, a roll for forming a blank on said support and movable with said carriage into and out of rolling engagement therewith, means for moving said carriage vertically, adjustable stops for limiting the downward movement of said carriage, and carriage controlled means for returning said stops to their original starting position.

16. A rolling mill comprising a bed, a work support on said bed, a roll for forming a blank on said work support, a vertically movable roll supporting carriage adapted to move said roll into and out of engagement with a blank on said work support, means for moving said carriage vertically, adjustable means for limiting the downward movement of said carriage, and a selectively operable manual and automatic means for adjusting the position of said movement limiting means.

17. A rolling mill comprising a rotatable support for a blank to be rolled, a roll for forming a blank on said support, means for moving said roll outwardly across the blank a plurality of times to make successive rolling passes, power operated means for feeding said roll toward the support between successive passes, stop means for limiting each successive feeding movement to a predetermined amount, and power means, operative between successive passes and during the continuous operation of the mill, for adjusting said stop means a predetermined amount for the next succeeding pass.

18. A rolling mill comprising a rotatable support for a blank to be rolled, a roll for forming a blank on the support, means for moving said roll outwardly across said blank a plurality of times to make successive rolling passes, power operated mechanism for feeding said roll toward said support between successive passes, a mechanically controlled stop for limiting successive feeding movements to a predetermined amount, and power means, operative between successive roll passes and during the continuous operation of the mill, for adjusting said stop and determining the position of the roll on the next succeeding pass.

19. A rolling mill comprising a rotatable support for a blank to be rolled, a roll for forming a blank on said support, means for moving said roll outwardly across the blank a plurality of times to make successive rolling passes, means for feeding the roll toward the support between successive passes, stop means for limiting each successive feeding movement to a predetermined amount, power means, operative between successive passes and during the continuous operation of the mill, for adjusting said stop means a predetermined amount for the next succeeding pass, and control means operated by the outward traverse of the roll to increase said outward traverse on each succeeding pass by a predetermined amount and in accordance with the increase in diameter of the blank being rolled.

FRANKLIN R. HIGHT.
ROBERT O. GREENSHIELDS.
FRIEDRICH J. MUELLER.